(No Model.)
J. H. HAMILTON.
WATER CLOSET.
No. 476,011. Patented May 31, 1892.
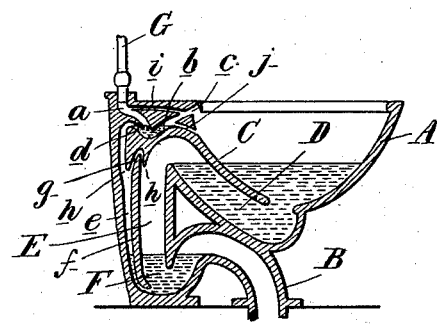
Witnesses:
P. M. Hulbert
N. L. Lindop
Inventor:
John H. Hamilton
By Thos. L. Sprague & Son
Attys.

United States Patent Office.

JOHN H. HAMILTON, OF DETROIT, MICHIGAN.

WATER-CLOSET.

SPECIFICATION forming part of Letters Patent No. 476,011, dated May 31, 1892.

Application filed November 12, 1891. Serial No. 411,757. (No model.)

*To all whom it may concern:*

Be it known that I, JOHN H. HAMILTON, a citizen of the United States, residing at Detroit, in the county of Wayne and State of Michigan, have invented certain new and useful Improvements in Water-Closets, of which the following is a specification, reference being had therein to the accompanying drawing.

This invention relates to new and useful improvements in water-closets; and it consists in the peculiar construction of the flushing device in a double trap or siphon closet, whereby a trap is provided in the siphon device and whereby the water in the stand-pipe connecting with the tank is drawn out into the bowl, all as more fully hereinafter described.

In the accompanying drawing I show in section a water-closet bowl and connections embodying my invention.

A is the bowl.

B is the exit soil-pipe.

C is a wall extending to near the bottom of the bowl and forming a trap D in the bottom of the bowl.

E is a vertical passage connecting at the top with the top of the trap D and at the bottom with a trap F, which connects with the exit soil-pipe B.

G is the supply-pipe leading from the water-supply tank, (which is not shown,) which may be of any desired construction. This supply-pipe connects into the passage $a$ in the top of the bowl, which leads downwardly into a trap $b$, from which a passage $c$ leads upward into the top rim of the bowl, and passage $d$ leads upwardly to the rear and connects with the vertical passage $e$, formed between the outer wall of the passage E and the partition $f$, connecting at the bottom into the bottom of the trap F. The passages E and $e$ are connected by the passage $g$, having the depending lips $h$ upon both sides.

$i$ is a vent-passage connecting the passage $a$ above the trap $b$ with the passage $c$ or the bowl, and $j$ is a downwardly-inclined drip-passage connecting the passage $c$ with the bowl below the rim.

The parts being thus constructed, their operation is as follows: The water flows through the pipe G from the tank through the passages $a\ c$ into the bowl to wash the same and down the passage $e$, drawing out the air through the passage $g$ from the passage E and flushing the bowl. When the water has stopped its flow from the tank, the standard G will yet be full of water, and to draw off this water the vent $c$ will allow the air to enter the passage $a$ gradually, and thus permitting the water to slowly flow into the bowl through the drip-passage $j$, emptying the standard. At the same time the passage $e$ will be sealed by the trap $d$, preventing any possible escape of foul air or gas from the passage E into the room.

What I claim as my invention is—

1. In a water-closet, the combination, with the bowl having a trap formed at its lower end and a discharge-pipe, of a supply-pipe, a trap formed in the bowl below the supply-pipe and above said other trap, a passage leading from the upper trap to the bowl, a discharge-passage formed in the rear of the bowl, its upper end leading into the upper trap, an air-space formed between the discharge-passage and the trap in the lower portion of the bowl, a vent in the dividing-wall between the discharge-passage and said air-space, a vent-passage between the bowl and supply-pipe, and a trap formed at the lower end of the air-space, substantially as described.

2. In a water-closet, the combination, with a bowl having a trap in the lower portion thereof, an air-space communicating with said trap formed in the rear of the bowl, a discharge-passage formed in the rear of the air-space, a trap at the lower end of the air-space and the discharge-passage, a vent in the wall between the air-space and discharge-passage, a supply-pipe, a trap below the pipe into which the upper end of the discharge-passage leads, a passage leading from the upper trap into the rim of the bowl, and a drip and vent passage between the supply-pipe and bowl, substantially as described.

In testimony whereof I affix my signature in presence of two witnesses.

JOHN H. HAMILTON.

Witnesses:
N. L. LINDOP,
M. B. O'DOGHERTY.